(12) United States Patent
Shah et al.

(10) Patent No.: US 7,663,849 B2
(45) Date of Patent: Feb. 16, 2010

(54) PERMANENT MAGNET GENERATOR PROTECTION SCHEME

(75) Inventors: Mahesh J. Shah, Lindenhurst, IL (US); Chai-Nam Ng, Rockford, IL (US); George Seffernick, Wapakoneta, OH (US)

(73) Assignee: Hamilton Sundstrand Corporation, Rockford, IL (US)

( * ) Notice: Subject to any disclaimer, the term of this patent is extended or adjusted under 35 U.S.C. 154(b) by 501 days.

(21) Appl. No.: 11/505,739

(22) Filed: Aug. 17, 2006

(65) Prior Publication Data

US 2008/0043383 A1 Feb. 21, 2008

(51) Int. Cl.
*H02H 7/00* (2006.01)
(52) U.S. Cl. ...................................... 361/20
(58) Field of Classification Search .................. 361/20
See application file for complete search history.

(56) References Cited

U.S. PATENT DOCUMENTS

| | | | |
|---|---|---|---|
| 4,114,084 A | 9/1978 | Glaudel et al. | |
| 4,641,080 A * | 2/1987 | Glennon et al. | ........... 322/49 |
| 4,950,973 A * | 8/1990 | Kouba | ................ 322/69 |
| 5,701,070 A | 12/1997 | Schultz | |
| 5,977,648 A | 11/1999 | Seffernick et al. | |
| 6,011,480 A | 1/2000 | Schweitzer, III et al. | |
| 6,701,221 B1 | 3/2004 | Eaton et al. | |
| 6,798,627 B2 | 9/2004 | Schultz et al. | |
| 6,850,043 B1 | 2/2005 | Maddali | |

\* cited by examiner

*Primary Examiner*—Stephen W Jackson
(74) *Attorney, Agent, or Firm*—Kinney & Lange, P.A.

(57) ABSTRACT

A fault protection system provides fault protection to a permanent magnet (PM) generator. The fault protection system includes one or more overload and short-circuit protection circuits, an unbalanced protection circuit and a thermal protection circuit. The overload and short-circuit protection circuit detects both overload and short-circuit conditions by monitoring current and voltage generated at a single phase by the PM generator. The unbalanced protection circuit monitors and compares current and voltage generated associated with at least two individual phases to determine unbalanced conditions between the phases. The thermal protection circuit detects a thermal overload condition by monitoring the temperature of the PM generator. If the overload and short circuit protection circuit, the unbalanced protection circuit, or the thermal protection circuit detects a fault signal, a control circuit causes a control device to reduce or prevent mechanical power from being supplied to the PM generator, preventing the PM generator from generating power and protecting it from damage.

20 Claims, 4 Drawing Sheets

PERMANENT MAGNET GENERATOR PROTECTION SCHEME

BACKGROUND OF THE INVENTION

The present invention relates generally to permanent magnet generators and control systems, and more particularly to protection schemes for permanent magnet generators.

In conventional systems that utilize a synchronous wound field generator, output voltage generated by the synchronous wound field generator is a function of the speed of the rotor and the excitation provided to the wound field. The output voltage of the wound field generator is controlled by selectively increasing or decreasing the excitation provided to the wound field. Likewise, protection of the wound field generator during fault conditions is simply a matter of removing the excitation provided to the wound field.

However, synchronous wound field generators do not offer the efficiency or robustness of other types of generators, such as permanent magnet generators. Advances in magnetic materials have made permanent magnet (PM) generators (in which the wound field is replaced with permanent magnets) increasingly popular. The permanent magnets provide the excitation flux needed to generate electricity in the armature windings. The absence of the rotating windings and diode assemblies required in the synchronous wound field generators make the PM generator inherently more rugged, efficient, and reliable. However, because the excitation flux generated by the permanent magnets is constant, the output voltage generated by a PM generator is a function only of the load and operating speed of the machine driving the rotor. Unlike synchronous wound field generators in which protection of the generator during a fault condition is a matter of simply removing the excitation provided to the wound field, the permanent magnets of the PM generator provide constant excitation. Therefore, in order to protect a PM generator, the rotation of the rotor must be reduced or stopped. The problem is further complicated if the PM generator receives mechanical power from a hydraulic motor. For instance, if the motor is a hydraulic motor, then a valve must be closed in order to reduce the mechanical power being provided to the PM generator. Therefore, protection schemes must be capable of quickly detecting and responding to fault conditions.

BRIEF SUMMARY OF THE INVENTION

The present invention provides a system and method of fault protection for a permanent magnet (PM) generator. The fault protection system includes overload and short-circuit fault condition protection and unbalanced fault condition protection. The fault protection system also includes monitoring devices for monitoring a first signal corresponding to a first phase of power and a second signal corresponding to a second phase of power. Overload and short-circuit fault conditions are detected based on the first signal, and unbalanced fault conditions are detected based on a comparison between the first signal and the second signal. Mechanical power provided to the PM generator is controlled based on the detected presence of an overload or short-circuit fault condition or an unbalance fault condition.

DETAILED DESCRIPTION

The present invention provides generally for a fault detection system for a permanent magnet (PM) generator. Three-phase alternating current power generated by the generator is monitored to detect fault conditions such as overloads, short-circuits, imbalances between phases, and overheating conditions. Detection of any one of these fault conditions results in the mechanical power provided to the permanent magnet generator being removed, preventing electrical energy from being generated by the permanent magnet generator.

Figure 1A:
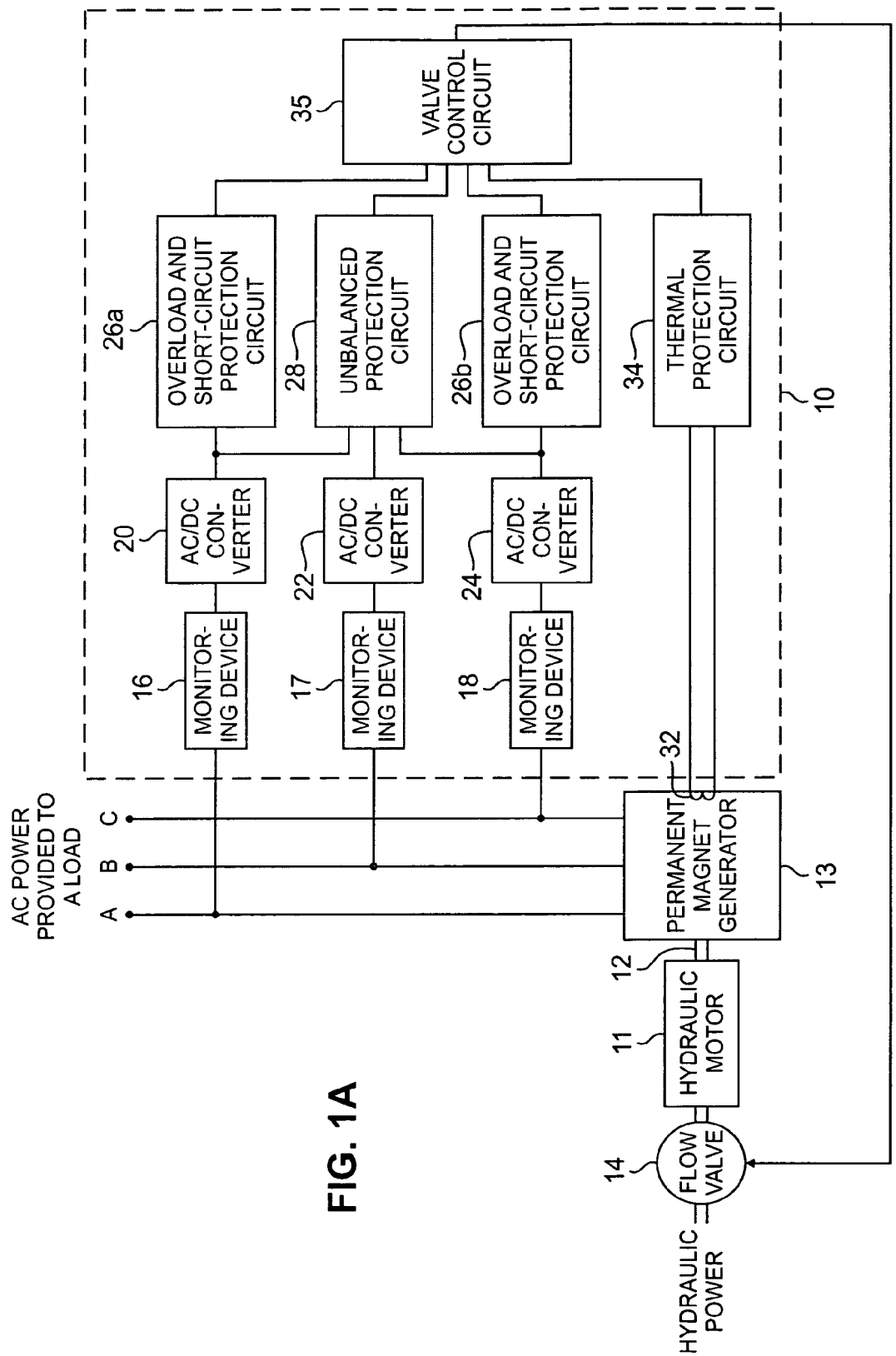
FIGS. 1A and 1B are functional block diagrams of a hydraulic motor driven permanent magnet generator having multiple fault detection protection.

FIG. 1A illustrates the elements of fault protection system 10 connected to an hydraulic motor driving PM generator system that includes hydraulic motor 11, drive shaft 12, permanent magnet (PM) generator 13, and hydraulic flow valve 14. Fault protection system 10 includes power monitoring devices 16, 17, and 18, alternating current (AC) to direct current (DC) converters 20, 22, and 24, overload and short-circuit protection circuits 26a and 26b, unbalanced fault protection circuit 28, thermal sensor 32, thermal protection circuit 34, and valve control circuit 35. Hydraulic power is provided to hydraulic motor 11, causing hydraulic drive shaft 12 to turn. The mechanical energy provided by hydraulic drive shaft 12 turns a rotor (not shown) within PM generator 13, resulting in three-phase AC power being generated. As long as hydraulic energy is provided to hydraulic motor 11, causing drive shaft 12 to turn the rotor, PM generator 13 will generate three-phase AC power. PM generator 13 is prevented from generating AC power by closing flow valve 14, preventing hydraulic power from being provided to hydraulic motor 11.

The embodiment shown in FIG. 1A is described with respect to a hydraulic motor driven PM generator, in which flow valve 14 is used to control delivery of mechanical power to PM generator 13. More generally, PM generator 13 may be provided with mechanical power by any type of prime mover. For instance, hydraulic motor 11 may be replaced with an engine (i.e., jet engine, diesel engine, or other) that provides mechanical energy to drive shaft 12. In this case, instead of flow valve 14 being used to decrease the hydraulic power provided to hydraulic motor 11, an electric clutch would be used to disengage mechanical power to shutdown PM generator 13. An electric brake may also be employed along with the electric clutch for decreasing the inertial energy of the rotor following disengagement of the rotor from motor by the electric clutch. Similarly, valve control circuit 35 would be replaced with an electric clutch or electric clutch-brake control circuit that could selectively engage or disengage mechanical energy provided to PM generator 13.

Valve control circuit 35 controls flow valve 14 based on input received from overload and short-circuit protection circuits 26a and 26b, unbalanced fault protection circuit 28, and thermal protection circuit 34. Because a fault condition detected by any one of the protection circuits should result in closing of flow valve 14, valve control circuit 35 may be implemented as an OR logic gate that provides a control signal causing flow valve 14 to close if any one of the protection circuits indicates a fault condition. In other embodiments, valve control circuit 35 may act to partially close flow valve 14 to reduce the power generated by PM generator 13.

To detect fault conditions, each phase of AC power (labeled A, B, and C) generated by PM generator 13 is monitored, without substantially affecting the output power provided by PM generator 13 to a load (not shown). Monitoring devices 16, 17 and 18 measure the current and/or voltage associated with phase A, phase B, and phase C, respectively. Because the currents generated by PM generator 13 may be very high (e.g., 100 amperes), monitoring devices 16, 17 and 18 may employ devices such as a current transformer to monitor current generated by PM generator 13. A current transformer inductively couples the current provided by PM generator 13 to generate an AC voltage signal (typically fairly small) representative of the AC current generated by PM generator 13. Likewise, monitoring devices 16, 17 and 18 may employ potential transformers to monitor the terminal voltage generated by PM generator 13. It should be recognized that other methods of measuring terminal voltage and current (or more generally, power) generated by each phase of permanent magnet generator 16 could be employed.

Monitoring devices 16, 17, and 18 are thus capable of monitoring both the current and voltage generated by PM generator 13. Depending on the application, monitoring devices 16, 17, and 18 may monitor only the voltage generated by PM generator 13, only the current generated by PM generator 13, or a combination of voltage and current generated by PM generator 13. Therefore, in one embodiment, the output of monitoring devices 16, 17, and 18 may be AC output voltage signals representing either the measured current or the measured terminal voltage in each respective phase. In another embodiment, the AC output signals from each respective phase may include a first AC output voltage signal representing the measured current and a second AC output voltage signal representing the measured terminal voltage. In another embodiment, the AC output voltage signals provided by monitoring devices 16, 17 and 18 represent a combination of the measured current and the measured terminal voltage.

The output(s) of monitoring devices 16, 17, and 18 are provided to AC/DC converters 20, 22, and 24, respectively. AC/DC converters 20, 22 and 24 convert the AC output voltage signals (representing measured current or measured terminal voltage) to DC output signals. For instance, monitoring device 16 may monitor both current and voltage generated at phase A by PM generator 13. In this case, monitoring device 16 provides AC/DC converter 20 with a first AC output signal representing the measured current and a second AC output signal representing the measured terminal voltage. AC/DC converter 20 operates to convert the respective AC output signals into a first DC output signal representing the measured current and a second DC output signal representing the measured terminal voltage. The DC output signal generated by AC/DC converters 20, 22, and 24 are then supplied to the protection circuits as shown in FIG. 1.

In the embodiment shown in FIG. 1, DC output signals generated by AC/DC converters 20 and 24 (representing measured values associated with phase A and phase C) are provided to overload and short-circuit protection circuits 26a and 26b, respectively. The DC voltage signals generated by AC/DC converters 20, 22, and 24 (representing measures values associated with phase A, phase B, and phase C) are provided to unbalanced fault protection circuit 28.

Overload and short-circuit protection circuits 26a and 26b operate to detect whether phase A or phase C, respectively, are subject to overload (excessive voltage and current generated by PM generator 13) or short-circuit conditions (low-resistance connection bypassing a load, resulting in excessive current drawn from PM generator 13). Unbalanced fault protection circuit 28 operates to detect unbalanced conditions between phases A, B and C. If a fault condition is detected by either of these protection circuits, a fault signal is communicated to valve control circuit 35.

Similarly, thermal protection circuit 34 generates a fault signal if the temperature of PM generator 13 exceeds a threshold limit. Thermal protection circuit 34 receives data regarding the temperature of PM generator 13 from thermal sensor 32 mounted on the stator coils (not shown) of PM generator 13. In one embodiment, thermal protection circuit 34 includes logic circuitry that allows the sensed temperature of the stator coils to exceed the threshold value for a select amount of time before a fault condition is signaled. The higher the sensed temperature, the more quickly thermal sensing device 32 will provide a fault signal to valve control circuit 35.

The embodiment shown in FIG. 1A describes overload and short-circuit protection circuits 26a and 26b, and unbalanced protection circuit 28 as analog devices that receive a DC signal representative of the AC power generated by PM generator 13 from AC/DC converters 20, 22, and 24, respectively. In another embodiment, the function of the protection circuits may be implemented by a digital processor.

Figure 1B:
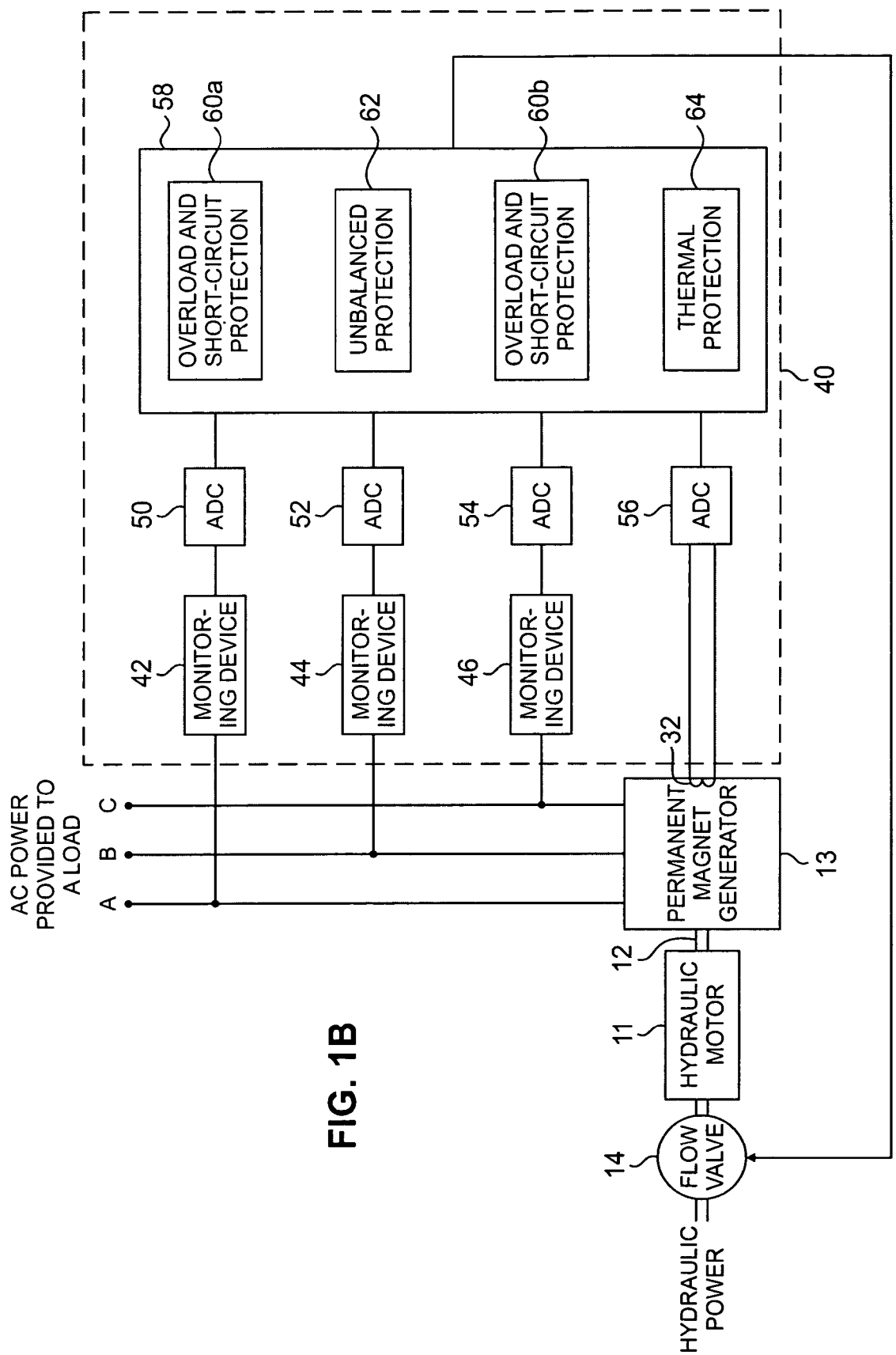

FIG. 1B illustrates shows fault detection system 40 that includes digital processor 58 to provide fault condition detection. Like fault detection system 10 shown in FIG. 1A, fault detection system 40 is connected to protect a hydraulic motor driving PM generator system that includes hydraulic motor 11, drive shaft 12, permanent magnet (PM) generator 13, and hydraulic flow valve 14. Fault detection system 40 includes monitoring devices 42, 44, and 46, thermal sensor 48, analog-to-digital converters (ADCs) 50, 52, 54 and 56, digital processor 58 for performing overload and short circuit protection calculations (as shown by block 60a and 60b), unbalanced protection calculations (shown by block 62), and thermal protection calculations (shown by block 64). Based on these calculations, digital processor 58 provides a control signal to flow valve 14 to either open or close the flow valve as required to protect PM generator 13.

As described above with respect to FIG. 1A, monitoring devices 42, 44, and 46 measure the current and/or voltage associated with power generated at phases A, B, and C, respectively. Depending on the application, monitoring devices 42, 44, and 46 may monitor only the voltage generated by PM generator 13, only the current generated by PM generator 13, or a combination of voltage and current generated by PM generator 13.

The output(s) of monitoring devices 42, 44, and 46 are provided to analog-to-digital converters (ADCs) 50, 52, and 54, respectively. ADC's 50, 52, and 54 convert the analog signals provided by monitoring devices 50, 52, and 54, respectively, to digital signals. For instance, monitoring device 42 may monitor both current and voltage generated at phase A by PM generator 13. In this case, monitoring device 42 provides ADC 50 with a first AC output signal representing the measured current and a second AC output signal representing the measured terminal voltage. ADC 50 operates to convert the respective analog AC output signals into a first digital output signal representing the measured current and a second digital output signal representing the measured terminal voltage. In other embodiments, ADCs 50, 52, and 54 may provide analog signals representing monitored current, voltage, or a combination of both. In each case, ADCs 50, 52, and 54 convert the received analog signal to a digital output signal that is provided to digital processor 58.

As shown in FIG. 1B, thermal sensor 48 is connected to provide an analog signal to ADC 56 based on the sensed temperature of PM generator 13. ADC 56 converts this analog signal to a digital signal that is also provided to digital processor 58.

Digital processor 58 detects based on the provided digital signals the presence of overload and short-circuit conditions, unbalanced conditions, and excessive thermal conditions. Based on the detection of any one of these conditions, digital processor 58 sends a control signal to flow valve 14 to open or close the valve as required to protect PM generator 13.

Therefore, fault detection systems 10 and 40 protect PM generator 13 from a number of potential fault conditions, including overload, short-circuit, unbalanced, and thermal increase conditions. Valve control circuit, in response to a detected fault condition, generates a control signal causing flow valve 14 to close. This reduces the hydraulic power being provided to hydraulic motor 11 and ultimately prevents PM generator 13 or a respective load from being damaged. The algorithms used to detect overload and short-circuit fault conditions, as well as unbalanced fault conditions, are discussed with respect to FIGS. 2 and 3 below.

Overload and Short-Circuit Protection

Figure 2:
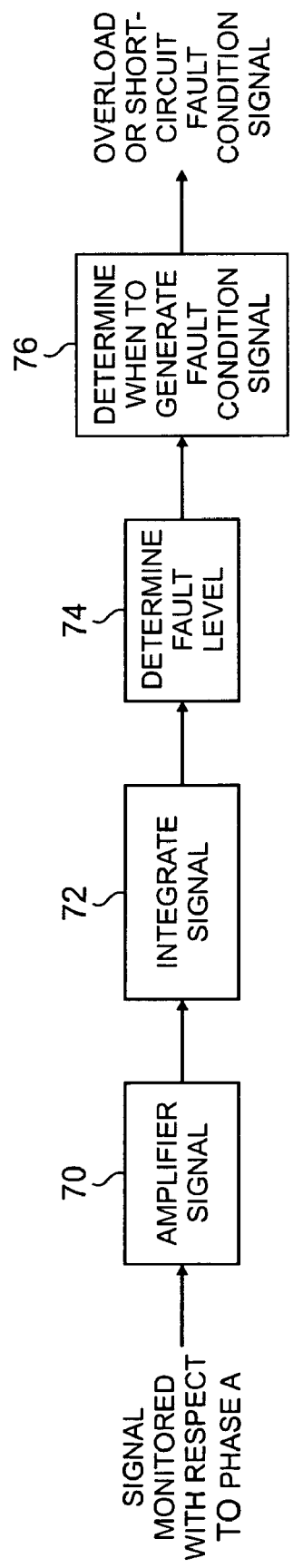
FIG. 2 is a functional block diagram of a method used to determine whether an overload or short-circuit conditions exists.

FIG. 2 illustrates an exemplary embodiment of the steps used to detect overload and short-circuit fault conditions. These steps may be performed by overload and short-circuit protection circuits 26a or 26b, or by overload and short-circuit calculations 60a and 60b as performed by digital processor 58. The method of detecting overload or short-circuit fault conditions associated with phase A of power generated by PM generator 13 is the same as the method used to detect the overload and short-circuit fault conditions in either phase B or phase C of power. Therefore, for the sake of simplicity, the method of detecting overload or short-circuit fault conditions is discussed with respect to phase A of power generated by PM generator 13.

Throughout the description of the method of detecting overload and short-circuit fault conditions (as well as unbalanced fault conditions), the term 'signal' refers to either analog or digital signals. In the embodiment shown in FIG. 1A, the signal provided to overload and short-circuit protection circuit 26a would be an analog signal. In the embodiment shown in FIG. 1B, the signal provided to digital processor 58 would be a digital signal. Furthermore, these operations may be performed by either hardware or software, or a combination of both.

At step 70, the signal is amplified or scaled. At step 72, the signal is integrated to generated a time-averaged signal representative of phase A. At step 74, the time-averaged signal is compared to a set value to determine the fault level or severity of the fault condition. At step 76, a decision regarding whether or not to generate a fault condition signal is made based on the fault level signal provided at step 74.

The purpose of amplifying the signal at step 70 is to scale the signal to a level that allows it to be compared with the set value at step 74. This operation may be performed by an amplifier circuit if analog signals are employed, or, if necessary, by digital processor 58 if digital signals are employed. Integrating the amplified signal at step 72 averages anomalies and short-term spikes in either the monitoring current or voltage. Short-duration voltage or current spikes typically do not result in damage to either the load or PM generator 13. Therefore, the effect of a detected short-term voltage or current spike is minimized to avoid unnecessarily shutting down PM generator 13. In one embodiment, integration of an analog signal is performed by a low-pass filter that minimizes the weight given to short-term disturbances in the signal. For digital signals, a digital equivalent of a low-pass filter is used to generate a time-averaged signal. The resulting integrated or time-averaged signal is used at step 74 to determine the fault level of the signal.

At step 74, the integrated or time-averaged signal is compared to a set value that represents ideal or normal conditions. Based on this comparison, a fault level signal is generated that represents the severity of the fault condition (if any exists). The comparison may be performed by an analog comparator circuit (if analog signals are employed) or by digital processor 58 (if digital signals are employed). At step 76, a decision is made regarding whether a fault condition should be signaled based on the fault level signal provided at step 74. This step may be performed by decisional circuitry including timer circuitry that determines based on the magnitude of the fault level signal (severity of the fault condition) when to signal a fault condition. That is, a fault level indicating less severe fault (such as an overload condition) may be tolerated by PM generator 13 for an extended amount of time before shutdown of PM generator 13 is required. A fault level indicating a more severe fault (such as a short-circuit condition) may require immediate shutdown of PM generator 13 in order to protect both PM generator 13 and the load. The greater the magnitude of the fault level signal (indicating a more severe fault) the more quickly a fault condition is signaled at step 76. These steps may be performed by digital processor 58 if a digital signal is provided. The fault condition signal may be provided to a control circuit 35 (as shown in FIG. 1A) or may be used by digital processor 58 directly to determine whether to close flow valve 14.

For example, in one embodiment an analog signal provided by AC/DC converter 20 (as shown in FIG. 1A) representing the current monitored with respect to phase A of power is analyzed to detect overload or short-circuit conditions. In this example, during normal conditions the monitored current may be equal to approximately 100 amperes. After amplification and integration of the signal at steps 70 and 72, the representative signal is equal to approximately one volt. If a current of 100 amperes results in a representative signal of approximately one volt, then the set value used at step 74 to compare with the representative signal is also set to one volt. As long as the representative signal remains at one volt, then the fault level calculated at step 74 remains very small or equal to zero, and no fault condition is signaled.

During a short-circuit condition, the monitored current may increase from 100 amps to 500 amps or more, resulting in the representative signal increasing from one volt to five volts or higher. The large disparity between the representative signal (one volt) and the set value (five volts) results in a relatively large fault level signal being generated. The greater the magnitude of the fault level signal, the less time is allowed to pass before a fault condition signal is signaled at step 76. For instance, in the above example, detection of a short-circuit condition (epitomized by the large disparity between the representative signal and the set value) results in almost immediate signaling of a fault condition signal in order to protect PM generator 13 from excessive currents. In contrast, an overload condition characterized by increased current (e.g., 200 A) may result in a representative signal increasing from a normal level of one volt to two or three volts. The somewhat lesser disparity between the representative signal and the set value results in a more tolerant response, such as allowing PM generator 13 to continue operating in the overload condition for a set amount of time before signaling a fault condition (e.g., 1 hour). The amount of time before signaling a fault condition is dependent on the severity of the overload condition, as indicated by the magnitude of the fault level signal.

The above example employed a current monitored by monitoring device 16. Detection of overload and short-circuit conditions may also be based on the monitored terminal voltage. For instance, during normal operations the terminal voltage measured at phase A may be equal to approximately 100 V. The representative signal calculated at step 72 may equal approximately five volts. Therefore, a set value used at step 74 would be equal to five volts. During a short-circuit condition, the monitored terminal voltage decreases to approximately 0 V, resulting in the representative signal calculated at step 72 decreasing to approximately 0 V. Again, the large disparity between the set value and the representative signal results in almost immediate signaling of a fault condition signal in order to protect PM generator 13 from excessive currents caused by the short-circuit condition. An overload condition causes the terminal voltage to increase (e.g., from 100 V to 150 V). This increase results in an increase in the representative signal calculated at step 72 to increase (e.g., from 5 V to 6 V). The somewhat lesser disparity between the representative signal and the set value results in a more tolerant response, such as allowing PM generator 13 to continue operating in the overload condition for a set amount of time before signaling a fault condition (e.g., 1 hour).

Although the above examples were provided with respect to analog calculations provided based on fault protection system 10 shown in FIG. 1A, the algorithm could be implemented by hardware and/or software using digital processor 58 as shown in FIG. 1B.

Unbalanced Fault Protection Circuit

Figure 3:
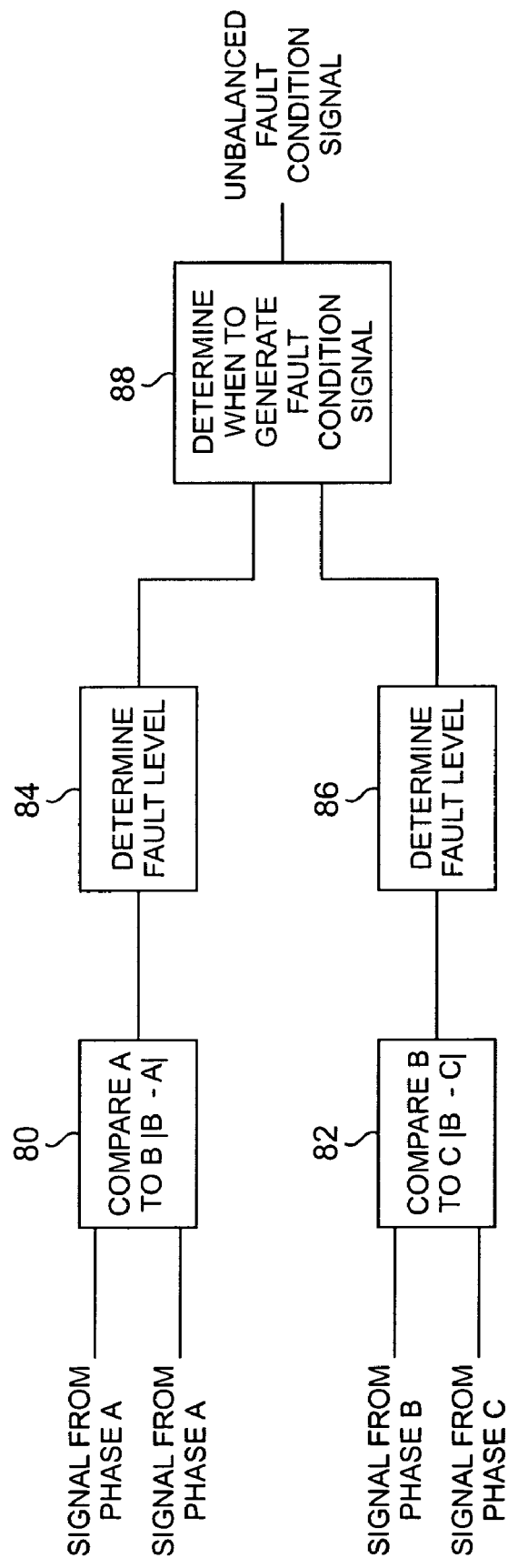
FIG. 3 is a functional block diagram of a method used to determine whether an unbalanced fault condition exists.

FIG. 3 illustrates an exemplary embodiment of the steps used to detect unbalanced fault conditions. These steps may be performed by unbalanced fault protection circuit 28 (as shown in FIG. 1A), or by digital processor 58 (as shown in FIG. 1B). In other embodiments, the operations may be performed by either hardware or software, or a combination of both.

In contrast with the detection of overload or short-circuit conditions that only monitor a single phase of power, detection of unbalanced fault conditions require a comparison between at least two phases of power. As shown in FIG. 3, a signal is provided with respect to phases A, B, and C. Under balanced conditions, the comparison between each of the respective phases of power should be equal (i.e., phase A=phase B=phase C). The algorithm used in FIG. 3 tests this relationship.

At step 80, a signal that represents phase A is compared with a signal that represents phase B, generating a first difference signal in the process. At step 82, a signal that represents phase B is compared with a signal that represents phase C, generating a second difference signal. The first and second difference signals are used at steps 84 and 86, respectively, to determine the fault level or severity of the unbalanced condition (if one exists). If the first and second difference signals are equal to approximately zero, then the phases are essentially balanced, and the fault level generated at steps 84 and 86 will reflect the absence of an unbalanced fault condition. As the difference between signals representing the respective phases increases, the fault level generated at steps 84 and 86 will indicate the presence of an unbalanced condition. The comparison between a first signal and a second signal may be performed by a comparator circuit (if an analog signal is provided) or may be performed by digital processor 58 (if a digital signal is provided).

At step 88, a determination of whether to generate a fault condition signal is made based on the first fault level signal generated at step 84 and the second fault level signal generated at step 86. As stated above with respect to the algorithm used to detect overload or short-circuit conditions, small imbalances between the respective phases may be tolerable by the system. In other embodiments, the magnitude of the imbalance determines the length of time that is allowed to pass before a fault condition signal is generated. The determination made at step 88 may be implemented with decisional logic. In one embodiment, the decisional logic may only include an OR logic gate that signals a fault condition if either the first fault level signal or the second fault level signal rises above a threshold value. In other embodiments, the algorithm shown in FIG. 3 is performed by digital processor 58.

CONCLUSION

A fault protection scheme has been described in which protection circuits monitor the power generated at each phase of the PM generator as well as the temperature of the PM generator. The protection circuits detect fault conditions based on these measurements and determine the appropriate response based on the severity of the fault condition.

Although the present invention has been described with reference to preferred embodiments, workers skilled in the art will recognize that changes may be made in form and detail without departing from the spirit and scope of the invention. In particular, the protection system is applicable to both constant frequency and variable frequency permanent magnet generators. Decision-making regarding the length of time that should pass before signaling a fault condition will be dependent on the application, and therefore may vary a great deal from the examples cited in the above description.

The invention claimed is:

1. A fault protection system for use with a permanent magnet (PM) generator, the fault protection system comprising:
    a monitoring device for monitoring a first signal corresponding to a first phase of power generated by the PM generator and a second signal corresponding to a second phases of power generated by the PM generator, the first signal and the second signal each being a function of at least one of current and voltage;
    overload and short-circuit protection means for detecting an overload or short-circuit fault condition based on the first signal and for generating a first fault condition signal if an overload or short-circuit fault condition is detected;
    unbalanced protection means for detecting an unbalanced condition based on the first signal and the second signal and for generating a second fault condition signal if an unbalanced fault condition is detected; and
    control means for controlling mechanical power provided to the PM generator as a function of the first fault condition signal and second fault condition signal.

2. The fault protection system of claim 1, further including:
    a thermal sensor for monitoring a temperature of the PM generator;
    thermal overload protection means for detecting the presence of a thermal overload condition based on the monitored temperature and for providing a third fault condition signal based on the detected thermal condition; and
    wherein the control means further controls the mechanical power as a function of the third fault condition signal.

3. The fault protection system of claim 1, wherein the overload and short-circuit protection means includes:
    level detecting means for comparing the first signal to a set value to generate a fault level signal; and decisional logic means for generating the first fault condition signal based on the fault level signal and at a time based on magnitude and duration of the first fault level signal.

4. The fault protection system of claim 1, wherein the unbalanced fault detection means includes:
first comparing means for comparing the first signal monitored with respect to the first phase of power with the second signal monitored with respect to the second phase of power to generate a first difference signal; and
first level detecting means for generating a first fault level signal based on the first difference signal.

5. The fault protection system of claim 4, wherein the means for detecting an unbalanced condition further includes:
second comparing means for comparing the second signal monitored with respect to the second phase of power with a third signal monitored with respect to a third phase of power to generate a second difference signal;
second level detecting means for generating a second fault level signal based on the second difference signal; and
combination means for generating the second fault condition signal based on the first fault level signal and the second fault level signal.

6. The fault protection system of claim 1, wherein the overload and short-circuit fault detection means and unbalanced fault detection means are implemented with a digital processor.

7. The fault protection system of claim 1, wherein the control means includes a flow valve that decreases mechanical power provided to the PM generator when closed.

8. The fault protection system of claim 1, wherein the control means includes a clutch that is controlled to reduce mechanical energy being provided to the PM generator.

9. A method of providing fault protection for a permanent magnet (PM) generator, the method comprising:
monitoring at least one signal generated at each phase of the PM generator, the signal being a function of at least one of current and voltage;
detecting presence of overload or short-circuit conditions based on a first signal monitored with respect to a first phase of power;
detecting presence of unbalanced conditions based on a comparison of the first signal monitored with respect to the first phase of power with a second signal monitored with respect to a second phase of power; and
controlling mechanical power to the PM generator based on detected presence of an overload or short-circuit condition or an unbalanced condition.

10. The method of claim 9, further including:
monitoring temperature of the PM generator using a thermal sensor; and
detecting the presence of a thermal overload condition based on the monitored temperature; and
controlling mechanical power to the PM generator based in further part on the detected presence of a thermal overload condition.

11. The method of claim 9, wherein detecting the presence of overload or short-circuit conditions includes:
generating a fault level signal based on a comparison between the first signal monitored with respect to a first phase of power and a set value representing normal conditions; and
generating a fault condition signal based on the fault level signal, wherein the fault condition signal is generated at a time that is dependent on the magnitude of the fault level signal.

12. The method of claim 9, wherein detecting the presence of unbalanced conditions includes:
comparing the first signal monitored with respect to the first phase of power with the second signal monitored with respect to the second phase of power; and
generating a first fault level signal based on the comparison between the first signal and the second signal.

13. The method of claim 12, wherein detecting the presence of unbalanced conditions further includes:
comparing the second signal monitored with respect to the second phase of power with a third signal monitored with respect to a third phase of power;
generating a second fault level signal based on the comparison between the second signal and the third signal; and
generating a fault condition signal based on the first fault level signal and the second fault level signal.

14. A fault protection system for use with a permanent magnet (PM) generator, the fault protection system comprising:
a monitoring device for monitoring at least one signal generated at each phase of the PM generator, the signal being a function of at least one of current and voltage;
an overload and short-circuit protection circuit for detecting the presence of overload or short-circuit conditions based on a first signal provided with respect to the first phase of power and generating a first fault condition signal based on the detected overload or short-circuit conditions;
an unbalanced protection circuit for detecting the presence of unbalanced conditions based on a comparison of the first signal provided with respect to the first phase of power with a second signal provided with respect to a second phase of power and generating a second fault condition signal based on a detected unbalanced condition;
a thermal sensor for monitoring a temperature of the PM generator;
a thermal protection circuit for detecting the presence of a thermal overload condition based on the monitored temperature associated with the PM generator and providing a third fault condition signal based on the detected thermal condition;
a control device for controlling delivery of mechanical power to the PM generator based on a control signal; and
a control circuit for providing the control signal to the control device based on the first fault condition signal, the second fault condition signal, and the third fault condition signal.

15. The fault protection system of claim 14, wherein the overload and short-circuit protection circuit includes:
a level detector circuit that generates a fault level signal based on a comparison between the first signal and a set value; and
a decisional logic and timer circuit that generates the first fault condition signal based on the fault level signal, wherein the decisional logic and timer circuit generates the first fault condition signal at a time that is dependent on the magnitude of the fault level signal.

16. The fault protection system of claim 14, wherein the unbalanced protection circuit includes:
a first comparator circuit that compares the first signal with the second signal to generate a first difference signal; and
a first level detector circuit that generates a first fault level signal based on the first difference signal provided by the first comparator circuit.

17. The fault protection system of claim 16, wherein the unbalanced protection circuit further includes:
- a second comparator circuit that compares the first signal with a third signal provided with respect to a third phase of power to generate a second difference signal; and
- a second level detector circuit that generates a second fault level signal based on the second difference signal provided by the second comparator circuit; and
- a combination circuit that generates the second fault condition signal based on the first fault level signal and the second fault level signal.

18. The fault protection system of claim 14, wherein the overload and short-circuit protection circuit, unbalanced protection circuit, thermal protection circuit, and control circuit is implemented by a digital processor.

19. The fault protection system of claim 14, wherein the control device comprises a flow valve that controls mechanical power provided to the PM generator based on the control signal provided by the control circuit.

20. The fault protection system of claim 14, wherein the control device comprises a clutch that controls mechanical power provided to the PM generator based on the control signal provided by the control circuit.

* * * * *

UNITED STATES PATENT AND TRADEMARK OFFICE
CERTIFICATE OF CORRECTION

PATENT NO. : 7,663,849 B2 Page 1 of 1
APPLICATION NO. : 11/505739
DATED : February 16, 2010
INVENTOR(S) : Shah et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 684 days.

Signed and Sealed this

Thirtieth Day of November, 2010

David J. Kappos
*Director of the United States Patent and Trademark Office*